United States Patent

[11] 3,583,640

| | | |
|---|---|---|
| [72] | Inventor | Howard R. MacDonald<br>San Diego, Calif. |
| [21] | Appl. No. | 873,367 |
| [22] | Filed | Nov. 3, 1969 |
| [45] | Patented | June 8, 1971 |
| [73] | Assignee | Rohr Corporation<br>Chula Vista, Calif. |

[54] JET PROPULSION APPARATUS AND METHOD OF OPERATING THE SAME
7 Claims, 9 Drawing Figs.

[52] U.S. Cl. .................................................. 239/265.13,
   60/230, 181/33.221, 239/265.17, 239/265.37
[51] Int. Cl. ..................................................... B64d 33/06
[50] Field of Search ........................................... 239/265.13,
   265.17, 265.19, 265.33, 265.37; 181/33.221,
   33.222; 60/230

[56] References Cited
UNITED STATES PATENTS
3,113,636 12/1963 Brown et al. ................. 181/60X 3,344,882 10/1967 Bellion et al. ................. 239/265.13X
FOREIGN PATENTS
428,257 5/1935 Great Britain .............. 181/33.221

*Primary Examiner*—Lloyd L. King
*Assistant Examiner*—Michael Y. Mar
*Attorney*—George E. Pearson ABSTRACT: Thrust nozzles are mounted in vertically stacked array on the aft end of an aircraft jet engine nacelle, and thrust reversing doors are mounted on opposite sides of the nozzles for movement between: (1) a stowed position adjacent to said nozzles; (2) a partially deployed position wherein the doors are translated rearwardly from their stowed position so as to deflect slipstream air against exhaust gas issuing from said nozzles; and (3) a fully deployed position wherein the doors abut downstream from the nozzles and deflect exhaust gas forwardly.

PATENTED JUN 8 1971

INVENTOR.
HOWARD R. MACDONALD

BY Edwin D. Grant

ATTORNEY

INVENTOR.
HOWARD R. MACDONALD
BY Edwin D. Grant
ATTORNEY

INVENTOR.
HOWARD R. MACDONALD
BY Edwin D. Grant
ATTORNEY 3,583,640

JET PROPULSION APPARATUS AND METHOD OF OPERATING THE SAME

SUMMARY OF THE INVENTION

This invention relates to jet-propelled aircraft and more particularly to a method and apparatus which are effective to suppress the noise generated by exhaust gas streams of such aircraft, as well as to reverse the thrust produced by said streams at a selected time.

Part of the noise associated with the operation of a jet-propelled aircraft results from the flow through the atmosphere of the high velocity, high temperature exhaust gas which is discharged from the engine, or engines, thereof. The amount of noise so generated by streams of jet engine exhaust gas is proportionate to their temperature and velocity. Moreover, the direction in which the major part of the noise of exhaust gas streams travels has been found to depend upon various factors such as the geometric configuration of said streams and the pattern of flow turbulence created therein.

The invention disclosed herein provides for the mixing of slipstream air flowing past a jet engine nacelle with exhaust gas discharged from a plurality of thrust nozzles mounted on the aft end of said nacelle, whereby the temperature and velocity, and thus the noise, of the exhaust gas stream is reduced. In addition, the arrangement of thrust nozzles in jet propulsion apparatus constructed in accordance with the concepts of this invention is such that exhaust gas of a jet engine is discharged to the atmosphere in a generally flat stream having a maximum dimension in the vertical direction and a minimum dimension in the horizontal direction, and thrust-reversing doors employed in said apparatus are arranged to direct slipstream air against the sides of said stream so as to create flow turbulence therein which causes the major portion of the noise generated by the exhaust gas to travel horizontally, thus decreasing the perceived noise level at the surface of the earth which lies under the aircraft propelled by said jet engine.

More specifically, in the preferred embodiment of the invention a plurality of thrust nozzles are mounted in vertically stacked relation on the aft end of an aircraft jet engine nacelle and extend rearwardly therefrom. A pair of thrust-reversing doors are shaped so that when they are in a stowed position relative to the nozzles their forward edges matingly abut the aft edges of the nacelle and their aft edges are respectively disposed adjacent the aft ends of said nozzles on opposite sides thereof. The doors are mounted for translation axially of the nacelle to a partially deployed position wherein their forward edges are axially aligned with, and spaced outwardly from, the aft edges of the nozzles and their aft edges are spaced apart downstream from said nozzles so that slipstream air flowing past the nacelle enters the gaps between said doors and said nozzles and impinges upon the streams of exhaust gas issuing from the latter. The drive mechanisms which move the doors between their stowed and partially deployed positions are also capable of swinging the doors to a fully deployed position wherein their aft edges abut downstream from the nozzles and their forward edges are spaced outwardly from the aft edges of the latter, whereby exhaust gas impinges upon the doors and is thereby deflected forwardly. If the engine enclosed within the nacelle is of the fan jet type, the nacelle is concentrically spaced around the turbine casing of said engine and a corrugated ring is disposed between the latter and the nozzles to cause mixing of exhaust gas with engine fan air discharged through the space between the turbine casing and the nacelle.

DETAILED DESCRIPTION

Figure 2:
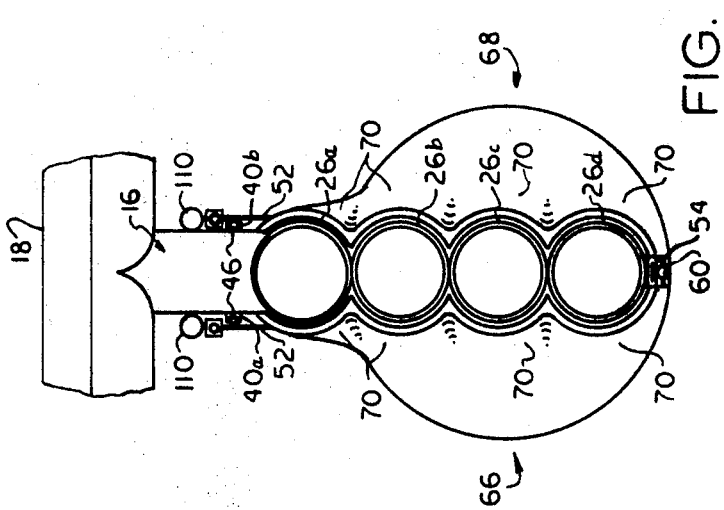
FIG. 2 is a rear elevation of the same embodiment, also illustrating the aforesaid thrust-reversing doors in their stowed position.
Figure 1:
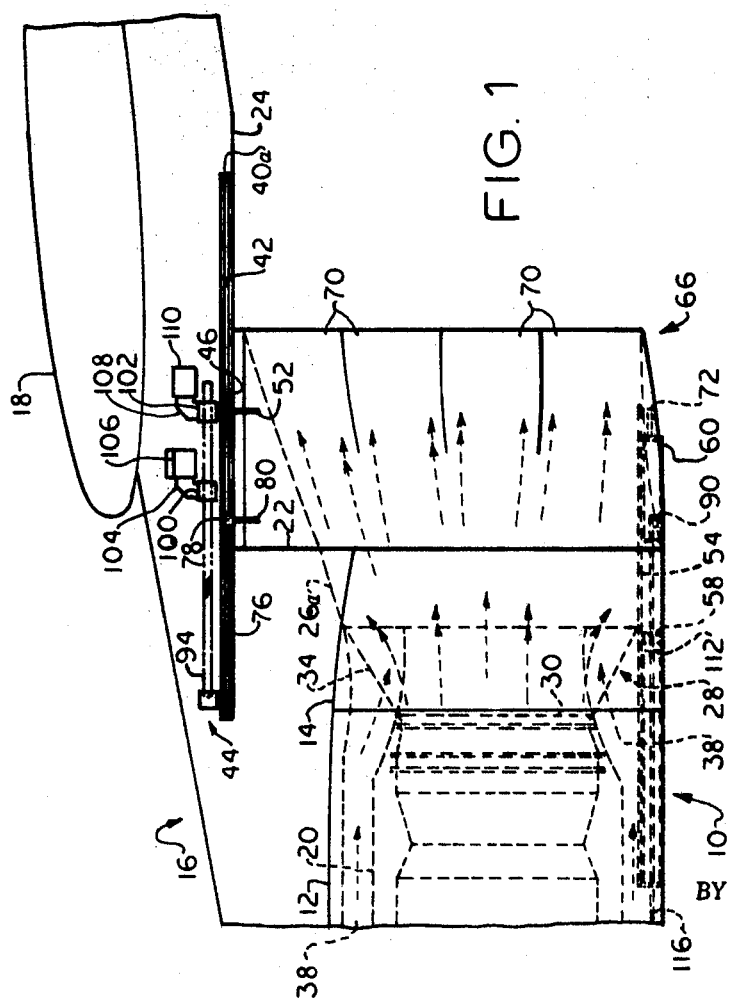
FIG. 1 is a side elevation of the aft portion of an aircraft jet engine nacelle and components associated therewith in a preferred embodiment of this invention, the drawing illustrating the stowed position of a typical one of a pair of thrust-reversing doors included in said embodiment.
Figure 3:
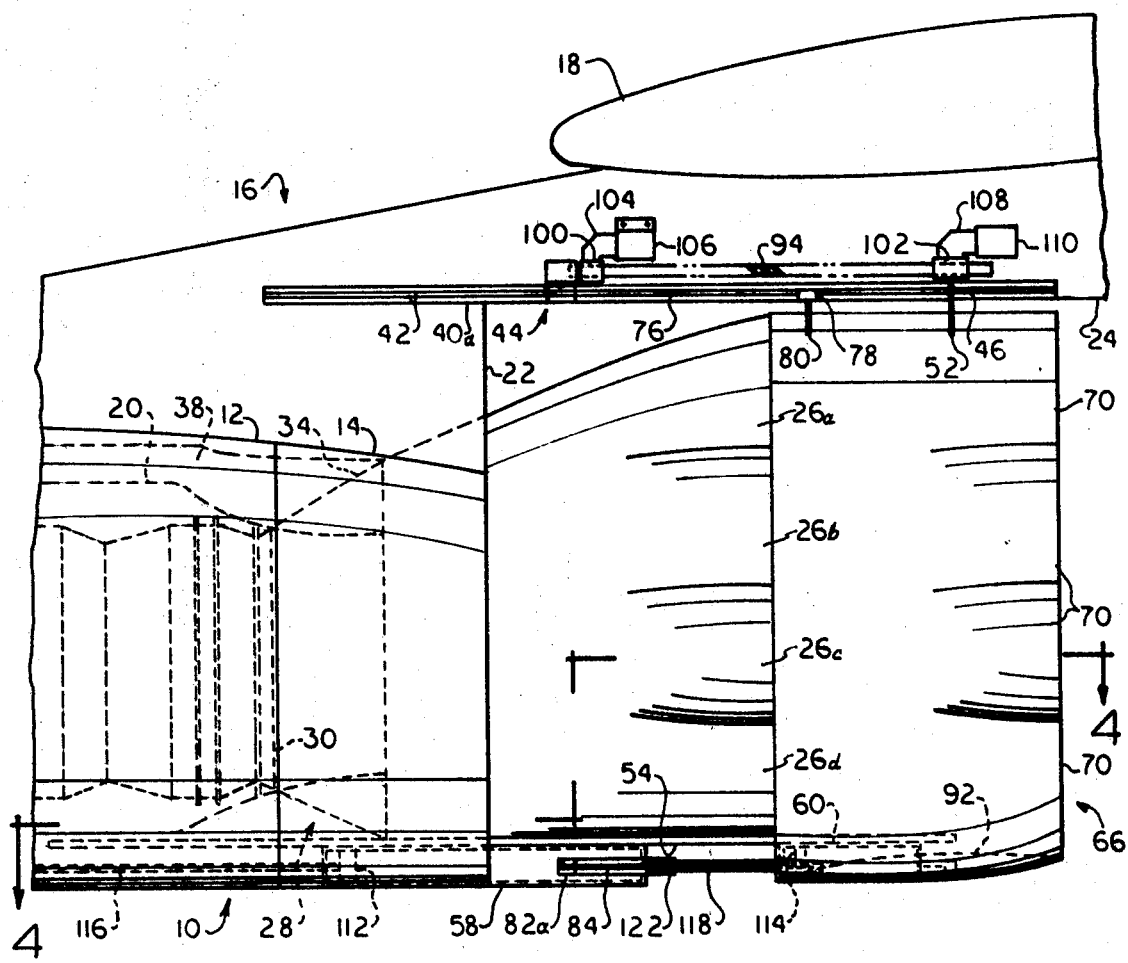
FIG. 3 is another side elevation of the same embodiment, the scale of the drawing being slightly larger than that of FIG. 1 and a typical one of the thrust-reversing doors being illustrated in a partially deployed position thereof.

As illustrated in FIGS. 1 and 2, a preferred embodiment of this invention comprises a tubular housing, or nacelle, which is generally designated by the number 10 and which comprises a forward section 12 and an aft section 14. Nacelle 10 encloses a fan jet engine and is mounted on a strut, generally designated 16, which depends from a wing 18 of an aircraft. The forward section 12 of the nacelle is concentrically spaced around the turbine casing 20 of the jet engine and is substantially coterminous with the aft end thereof, and fan air (represented by single-headed arrows in the drawing) of said engine is conducted through suitable ducts (not shown) to the space between the nacelle and the turbine casing. Between its forward and aft ends strut 16 is formed with a vertically disposed edge 22 that is coplanar with the aft edge of nacelle 10, and with a horizontally disposed edge 24 that extends rearwardly from said edge 22 and lies under wing 18. As can be seen in FIGS. 2 and 3, four thrust nozzles 26a—26d are mounted on the aft end of nacelle 10 and extend rearwardly therefrom in vertically stacked relation to one another, these nozzles being circular in cross-sectional configuration and the uppermost nozzle 26a projecting upwardly from the aft section 14 of housing 10 and passing between the sidewalls of strut 16. Disposed within the aft portion of nacelle 10 is a ring which is generally designated 28 and the circular forward edge of which is joined by suitable means to the aft edge 30 of turbine casing 20. The wall of ring 28 includes corrugations which extend longitudinally thereof and thereby form a plurality of lobes 32 (see FIG. 7). The crests of said lobes diverge in the downstream direction so that the aft ends thereof abut the inner surface of the aft section 14 of housing 10, and the valleys between the lobes converge in the downstream direction so that the aft ends thereof are spaced slightly inwardly relative to the aft edge 30 of turbine casing 20. It will also be noted in FIG. 7 that nacelle 10 has an inner wall 34 at the lower portion thereof, thus providing a space 36 within said nacelle which is not exposed to exhaust gas (illustrated by double-headed arrows in FIG. 1) discharged from turbine casing 20 or fan air flowing through the space 38 between said turbine casing and the wall of said nacelle.

Figure 8:
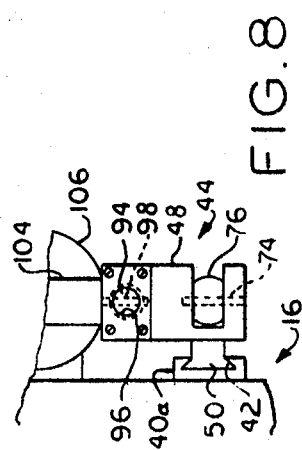
FIG. 8 is a fragmentary sectional view of the embodiment, taken along the vertical plane represented by line 8-8 in FIG. 5 and illustrating a typical one of two other drive mechanisms which are also associated with the thrust-reversing doors.

A pair of upper tracks 40a, 40b (FIGS. 1 and 2) are respectively secured to opposite sides of strut 16 in adjacency with edge 24 thereof, said upper tracks also projecting forwardly from edge 22 of said strut and each having a dovetail slot 42 extending lengthwise of its outer side. Two slides 44, 46 are mounted on each upper track for movement longitudinally thereof. More particularly, as illustrated in FIG. 8 each slide 44 comprises a slotted, vertically extending portion 48 and a dovetail portion 50, the latter being slidably disposed within the slot 42 of a respective one of said upper tracks. Each slide 46 is also provided with a dovetail portion that is slidably disposed within the slot 42 of a respective one of the upper tracks, and with a vertically disposed support bar 52 (again see FIG. 2). Other components which are associated with the slides 44, 46 on each upper track will be described hereinafter.

Figure 4:
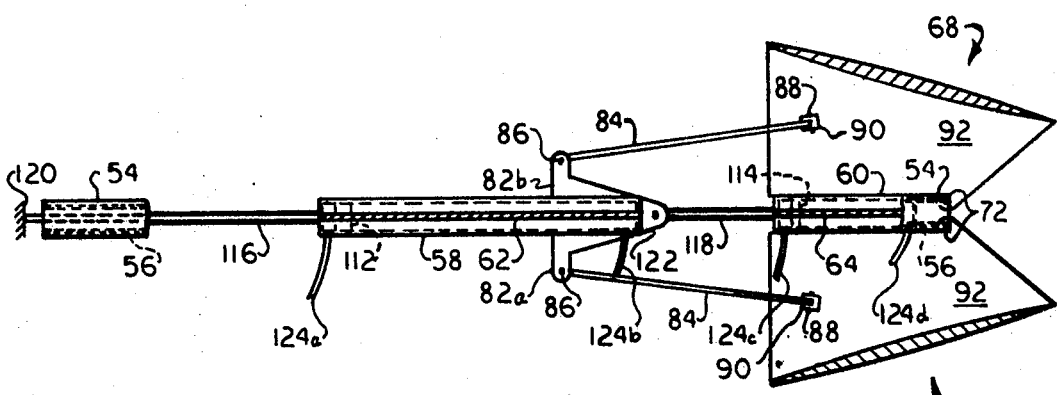
FIG. 4 is a view taken along the horizontal plane represented by line 4-4 in FIG. 3 and illustrating a drive mechanism associated with said thrust-reversing doors, the latter being shown in cross section and some components of the embodiment being omitted from the drawing so that said drive mechanism can be seen.

A lower track 54 is fixedly attached to the bottom of housing 10 and to the bottom of the lowermost nozzle 26d in parallel relation with the upper tracks 40a, 40b, and a dovetail slot 56 (see FIG. 4 wherein the forward and aft ends of track 54 are illustrated and the slot 56 in said track is represented by broken lines) extends lengthwise of the lower side thereof. FIG. 4 also illustrates two pressure-operated actuators 58, 60 each of which is mounted on lower track 54 by means of a dovetail projection 62, 64 which extends along its upper side and which is slidably disposed within the slot 56 in said track, these projections being shown in cross section at the point where they are joined to the respective actuators.

The lower ends of the support bars 52 of the rearmost slides 46 on the upper tracks 40a, 40b are respectively pivotally connected to the upper portions of a pair of thrust-reversing doors, generally designated 66, 68. As can be seen in FIGS. 1 and 2, these doors are shaped so that when they are in the stowed position illustrated in said drawings their forward edges respectively abut the aft edge of nacelle 10 on opposite sides thereof and also abut edge 22 of strut 16. Furthermore, the wall of each door is formed with longitudinally extending lobes 70 which conform with the contours of the vertically stacked nozzles 26a —26d, and the aft edges of the doors are located adjacent the aft edges of said nozzles when said doors are in the stowed position, with narrow gaps therebetween. The lower portions of the doors are pivotally connected to the aft end of actuator 60 by means of pins 72 (see FIG. 4).

As has been mentioned hereinbefore, the slide 44 of each upper track 40a, 40b comprises a slotted portion 48 (see FIG. 8). A pin 74 connects one end of a shaft 76 within the slot in said portion 48 of each slide 44 so that said shaft is rotatable about a vertical axis. The other end of each shaft 76 is fixedly connected to a boss 78 (see FIG. 1) formed on the upper end of a vertically disposed bar 80, the lower end of the latter being in turn pivotally connected to the upper portion of a respective one of the doors 66, 68 adjacent the forward edge thereof.

Fixedly joined to the aft end of actuator 58 (FIG. 4) and respectively projecting laterally from opposite sides thereof are two arms 82a, 82b. One end of a shaft 84 is pivoted to the free end of each of said arms by means of a pin 86, and the other end of this shaft is pivoted by means of a pin 88 to a lug 90 fixedly secured to the inner surface 92 of a respective one of the doors 66, 68 at the lower portion thereof, the longitudinal axes of said pins 86 and 88 being vertically disposed. The distance between pins 86 is preferably equal to the distance between pins 74 on slides 46, and the distance between pins 88 is preferably equal to the distance between bars 80 when the doors are in the different positions which will be described hereinafter.

As illustrated in FIGS. 1 and 8, one end of a screw 94 is disposed within a hole 96 in portion 48 of each slide 44, a pin 98 extending through holes in said portion 48 of each slide 44, a pin 98 extending through holes in said portion 48 and said screw to hold the latter in fixed position relative to the slide.

Each screw 94 passes through nuts in a pair of gear housings 100, 102 which are driven by gears (not shown) enclosed therein, and each gear housing 100 is connected to a drive mechanism 104 associated with a drive motor 106 fixedly mounted on one side of strut 16. Each gear housing 102 is also connected to a drive mechanism 108 associated with a drive motor 106 fixedly mounted on one side of strut 16. Each gear housing 102 is also connected to a drive mechanism 108 associated with a drive motor 110. However, gear housings 102 are not fixed to the strut but can travel on the screws 94 when the motors 110 are actuated. The gear housings 102 are respectively fixedly mounted to the upper ends of the bars 52 on slides 46.

As illustrated in FIG. 4, there is a piston 112, 114 slidably disposed within the bore of each actuator 58, 60, and a piston rod 116, 118 is connected to this piston and extends through an aperture in the forward end of the actuator. The outer end of piston rod 116 is connected to a member 120 fixedly disposed within the space 36 at the lower portion of nacelle 10, while the outer end of piston rod 118 is connected to a lug 122 on the aft end of actuator 58. Conduits 124a —124d are respectively communicatively connected with the forward and aft ends of the bore of each actuator and with conventional pressuring apparatus (not shown) which is mounted on nacelle 10 and adapted to vary the pressure applied to opposite sides of pistons 112 and 114.

OPERATION

Figure 5:
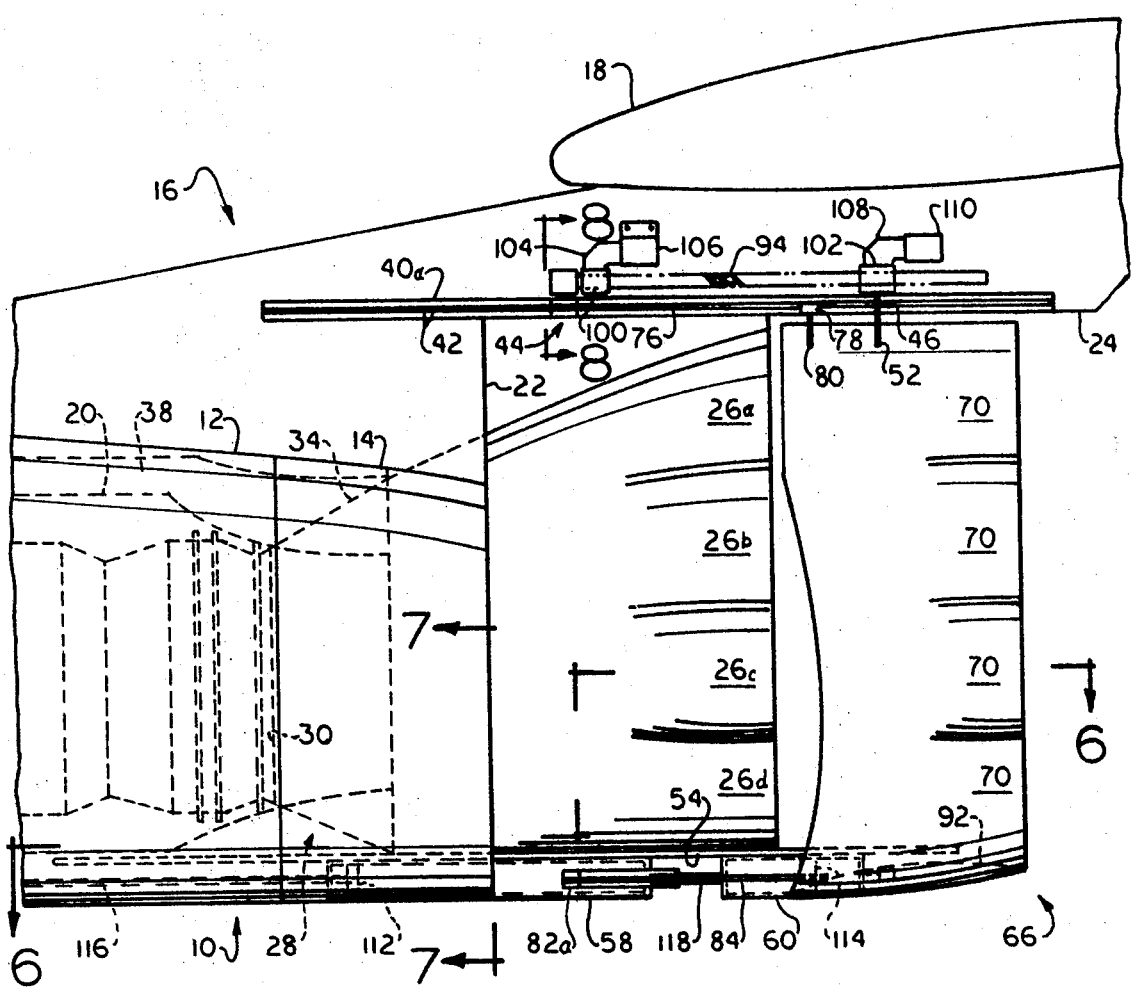
FIG. 5 is another side elevation of the same embodiment, the scale of the drawing being the same as that of FIG. 3 and a typical one of the thrust-reversing doors being illustrated in a fully deployed position thereof.
Figure 7:
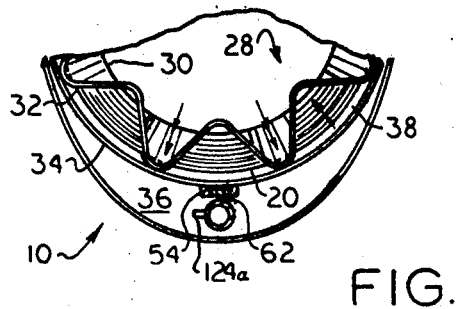
FIG. 7 is a fragmentary sectional view of the embodiment, taken along the vertical plane represented by line 7-7 in FIG. 5 and illustrating a portion of corrugated ring mounted within the aft portion of said nacelle.

A portion of the fan air which flows through the space 38 between nacelle 10 and turbine casing 20 flows inwardly along the convergent aft section of said casing and along the curved walls between the lobes 32 of ring 28, as indicated by singleheaded arrows in FIGS. 1 and 7. A portion of the exhaust gas discharged from the aft end of the turbine casing also flows outwardly along the inner surfaces of said lobes 32, as indicated by double-headed arrows in the same drawings. Hence streams of fan air and streams of exhaust gas are disposed in alternate relation circumferentially of nacelle 10 at the aft end thereof. Thus the streams discharged through nozzles 26a — 26d consist of a mixture of fan air and exhaust gas, and the temperature and velocity of said streams are lower than they would be if they consisted of exhaust gas only. Consequently even when doors 66 and 68 are in their stowed position which is illustrated in FIGS. 1 and 2, the arrangement of the disclosed apparatus suppresses the noise of the exhaust gas discharged from the fan jet engine within nacelle 10. However, to achieve maximum sound suppression, the doors are translated to their partially deployed position which is illustrated in FIGS. 3 and 4, wherein the forward edges of the doors are axially aligned with the exits of nozzles 26a —26d (i.e., the forward edges of the doors and the aft edges of the nozzles are included in a plane perpendicular to the longitudinal axis of nacelle 10) and the aft edges of the doors are spaced apart downstream from said nozzles. This translation of the doors from the stowed to the partially deployed position is effected by operating the pressurizing apparatus associated with actuator 58 so that fluid is injected into said actuator through conduit 124b and released therefrom through conduit 124a. Since piston rod 116 is fixed to nacelle 10, the flow of fluid into the portion of the bore of actuator 58 which lies between piston 112 and the aft end of said actuator causes the actuator to move rearwardly on track 54. During this movement of actuator 58 there is no flow of pressurizing fluid into, or out of, actuator 60. Since piston rod 118 of actuator 60 is connected to actuator 58, movement of the latter rearwardly on lower track 54 as describe also moves actuator 60 from the position thereof which is illustrated in FIG. 1 to the position thereof which is illustrated in FIGS. 3 and 4. It should be noted that piston 114 is located adjacent the forward end of the bore in actuator 60 during the operation which has just been described. Drive motors 106 are arranged to operate synchronously with the pressurizing apparatus connected with actuators 58 and 60 so that when actuator 58 is moved rearwardly on lower track 54 and drive motors operate to rotate the gears in drive mechanisms 104 and gear housings 100 in such manner that screws 94 are moved from the forward position thereof which is illustrated in FIG. 1 to the rear position thereof which is illustrated in FIGS. 3 and 5. Drive motors 110 are not operated during this translation of the doors, and drive motors 106 are operated so that the rearward velocity of screws 94 is equal to the rearward velocity of actuator 58. This can be accomplished by interconnecting screws 94 and actuator 58 by cables, or by using sensing devices to regulate the movement of said components. Since doors 66 and 68 are respectively connected by means of bars 52 to the gear housings 108 mounted at the aft ends of screws 94 and since they are also connected to actuator 58, the rearward movement of said screws and actuator translates the doors to the aforedescribed partially deployed position forming an ejector around the exhaust nozzle. Slipstream air flowing past nacelle 10 and nozzles 26a—26d then enters the gaps between the latter and the doors, creating additional thrust. This ambient air also impinges against the sides of the streams of combined fan air and exhaust gas issuing from said nozzles, thereby cooling it and creating turbulence in the exhaust plume of the propulsion assembly which results in some reduction of noise and in the radiation of much of the remaining sound energy of said exhaust plume in the horizontal direction.

Figure 9:
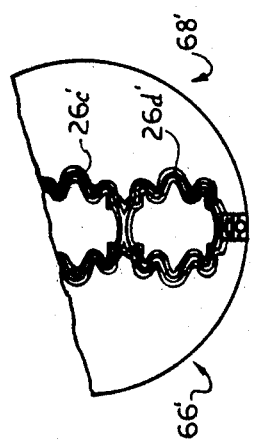
FIG. 9 is a fragmentary rear elevation of a modification of the thrust nozzles included in the embodiment illustrated in FIGS. 1-8.
Figure 6:
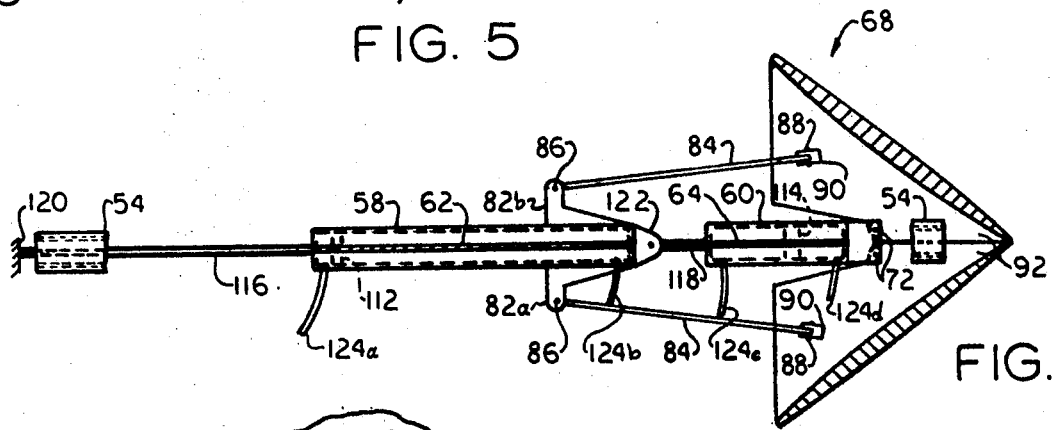
FIG. 6 is a view taken along the horizontal plane represented by line 6-6 in FIG. 5 and illustrating the aforesaid drive mechanism in an operation mode different from that illustrated in FIG. 4, the thrust-reversing doors again being shown in cross section.

During the landing of the aircraft equipped with apparatus in accordance with the invention, fluid is injected into actuator 60 through conduit 124c while the same is released therefrom through conduit 124d. Actuator 58 is maintained in its position at the middle of lower track 54, and thus actuator 60 moves forwardly relative to piston rod 118 (see FIGS. 4 and 6). Simultaneously drive motors 110 are operated to move gear housings 102 forwardly on screws 98 at a velocity equal to that of actuator 60. This translation of actuator 60. This translation of actuator 60 and gear housings 102 swings doors 66, 68 to the fully deployed position thereof which is illustrated in FIGS. 5 and 6, wherein the aft ends of said doors abut at the vertical plane which includes the longitudinal axes of nozzles 26a—26d and wherein the forward edges of said doors are spaced outwardly from the exits of said nozzles. Thereafter the streams of fan air and engine exhaust gas issuing from the nozzles impinge upon the doors and are thereby deflected forwardly, reversing the thrust of the propulsion assembly and decelerating the aircraft. It will be obvious that the pressuring apparatus associated with actuators 58 and 60 and drive motors 106 and 110 can be operated to return the thrust reversing to their stowed position in abutment with the aft edge of nacelle 10 and edge 22 of strut 16. It will also be obvious that various modifications can be made in the apparatus which has been described and illustrated, without departing from the concepts of the invention. For example, the drive mechanisms associated with doors 66, 68 may be of the same type at the points where said doors are mounted to the lower portion of nacelle 10 and to strut 16. As illustrated in FIG. 9, thrust nozzles 26a—26d may be replaced with convoluted nozzles 26a'—26d', in which embodiment the aft edges of the thrust-reversing doors 66'—68' are shaped to fit close to the surfaces of the nozzles when the doors are in the stowed position. The scope of the invention should therefore be considered as being limited only by the terms of the claims appended hereto.

What I claim as new and useful and desired to be secured by U.S. Letters Patent is:

1. In an aircraft jet propulsion assembly wherein a jet engine is enclosed in a tubular nacelle, the combination comprising:

a plurality of thrust nozzles mounted on the aft end of said nacelle and extending rearwardly therefrom in vertically stacked relation to one another, exhaust gas of said engine being discharged through said nozzles;

a pair of thrust-reversing doors operatively associated with said assembly and formed so that in a stowed position thereof their forward edges respectively conform with and lie adjacent the aft portions of opposite sides of said nacelle and their aft edges respectively conformably fit around the aft portions of opposite sides of said nozzles, said doors being movable to a partially deployed position wherein their forward edges are respectively substantially axially aligned with and spaced outwardly from the exits of said nozzles and their aft edges are spaced apart downstream from said nozzles so that slipstream air flowing past said nacelle enters the gaps between said doors and said nozzles to thereby increase thrust and mix with exhaust gas issuing from the latter, said doors also being movable to a fully deployed position wherein their aft edges abut at a point downstream from said nozzles and said exhaust gas impinges on said doors and is thereby deflected forwardly; and means operatively associated with said assembly for synchronously moving said doors between said stowed, partially deployed, and fully deployed positions.

2. The combination of claim 1 wherein each of said nozzles is circular in cross section.

3. The combination of claim 1 wherein each of said nozzles is formed with longitudinally extending lobes.

4. The combination of claim 1 wherein said nacelle is mounted on a strut and said doors are respectively mounted on a track attached to the bottom of said nacelle and on tracks attached to opposite sides of said strut.

5. In an aircraft jet propulsion assembly having a fan jet engine, the combination comprising:

a tubular nacelle disposed in spaced relation around the aft portion of the casing of said engine and extending rearwardly therefrom, fan air of said engine being discharged through the space between said nacelle and casing;

a corrugated ring attached to the aft edge of said casing and extending rearwardly therefrom, the corrugations of said ring extending longitudinally thereof and gradually increasing in depth in the downstream direction to thereby form on said ring a plurality of lobes which project both inwardly from said casing and outwardly to the wall of said nacelle, exhaust gas of said engine flowing through said lobes and said fan air flowing through the spaces there between;

a plurality of thrust nozzles mounted on the aft end of said nacelle and extending rearwardly there from in vertically stacked relation to one another, said exhaust gas and said fan air being discharged together through said nozzles;

a pair of thrust-reversing doors operatively associated with said assembly and formed so that in a stowed position thereof their forward edges respectively conform with and lie adjacent the aft portions of opposite sides of said nacelle and their aft edges respectively conformably fit around the aft portions of opposite sides of said nozzles, said doors being movable to a partially deployed position wherein their forward edges are respectively substantially axially aligned with and spaced outwardly from the exits of said nozzles and their aft edges are spaced apart downstream from said nozzles so that slipstream air flowing past said nacelle enters the gaps between said doors and said nozzles to thereby increase thrust and mix with exhaust gas issuing from the latter, said doors also being movable to a fully deployed position wherein their aft edges abut at a point downstream from said nozzles and said exhaust gas impinges on said doors and is thereby deflected forwardly; and means operatively associated with said assembly for synchronously moving said doors between said stowed, partially deployed, and fully deployed positions.

6. A method of operating an aircraft having a jet engine enclosed within a tubular nacelle, which comprises:

discharging exhaust gas of said engine through a plurality of nozzles mounted on the aft end of said nacelle and extending rearwardly therefrom in vertically stacked relation to one another;

in a first operational mode of said aircraft positioning a pair of thrust-reversing doors respectively on opposite sides of said nozzles with the forward edges of said doors conformably fitted to the aft portion of said housing;

in a second operational mode of said aircraft positioning said doors so that their forward edges are respectively substantially axially aligned with and spaced outwardly from the exits of said nozzles and their aft edges are spaced apart downstream from said nozzles, whereby slipstream air flowing past said nacelle enters the gaps between said doors and said nozzles to thereby increase thrust and mix exhaust gas issuing from the latter; and in a third operational mode of said aircraft positioning said doors so that their aft edges abut downstream from said nozzles, whereby said exhaust gas impinges on said doors and is thereby deflected forwardly.

7. The method of claim 6 wherein said engine is of the fan jet type and fan air and exhaust gas thereof are discharged together through said nozzles.